United States Patent

Harris et al.

[11] Patent Number: 5,834,546
[45] Date of Patent: Nov. 10, 1998

[54] GOLF BALL CORE BLENDS CONTAINING OXA ACIDS

[75] Inventors: Kevin M. Harris, New Bedford; Murali Rajagopalan, South Dartmouth, both of Mass.

[73] Assignee: Acushnet Company, Fairhaven, Mass.

[21] Appl. No.: 827,011

[22] Filed: Mar. 25, 1997

[51] Int. Cl.$^6$ .............................. A63B 37/06; C08K 5/09
[52] U.S. Cl. .................. 524/320; 473/357; 473/371; 473/372; 473/373; 473/374; 473/377
[58] Field of Search ...................... 473/357, 371, 473/372, 373, 374, 377; 524/320

[56] References Cited

U.S. PATENT DOCUMENTS 2,183,853 12/1939 Haussmann .
4,777,211 10/1988 Lavengood ................ 525/66
5,616,640 4/1997 Harris ........................ 473/378

*Primary Examiner*—David Buttner
*Attorney, Agent, or Firm*—Pennie & Edmonds LLP

[57] ABSTRACT

A golf ball comprising a cover and core, wherein the core is formed from a blend comprising an oxa acid compound having the formula:

$$\underset{\text{HO}-\overset{\overset{\displaystyle O}{\|}}{C}-CH_2-O-R,}{} \quad \text{(Formula I)}$$

wherein R is an organic moiety selected from the group consisting of alkyl, carbocyclic, and heterocyclic groups. Golf balls employing the present core blends exhibit a decreased compression without an adverse impact on the initial velocity of the ball.

18 Claims, No Drawings

GOLF BALL CORE BLENDS CONTAINING OXA ACIDS

FIELD OF INVENTION

The present invention is directed toward novel blends comprising at least one oxa acid compound for forming golf ball cores and methods for forming golf balls with such cores.

BACKGROUND OF THE INVENTION

Conventional golf balls can be divided into three general types or groups: (1) two piece balls, (2) wound balls (also know as three piece balls), or (3) multilayer balls. The difference in play characteristics resulting from these different types of constructions can be quite significant.

Balls having a two piece construction are generally most popular with the average recreational golfer because they provide a very durable ball while also providing maximum distance. Two piece balls are made with a single solid core, usually formed of a crosslinked rubber, which is encased by a cover material. Typically the solid core is made of polybutadiene which is chemically crosslinked with zinc diacrylate and/or similar crosslinking agents and is covered by a tough, cut-resistant blended cover. The cover is generally a material such as SURLYN®, which is a trademark for an ionomer resin produced by DuPont. The combination of the core and cover materials provide a "hard" ball that is extremely durable. Further, such a combination imparts a relatively high initial velocity to the ball which results in improved distance. Because these materials are very rigid, two piece balls have a hard "feel" when struck with a club. Likewise, due to their hardness, these balls have a relatively low spin rate which provides greater distance as compared to balls with higher spin rates.

At the present time, the wound ball remains the preferred ball of the more advanced players due to its spin and feel characteristics. Wound balls typically have either a solid rubber or liquid center core around which many yards of a stretched elastic thread or yarn are wound. The wound core is then covered with a durable cover material such as a SURLYN® or similar material or a softer cover such as Balata or polyurethane. Wound balls are generally softer and provide more spin, which enables a skilled golfer to have more control over the ball's flight and final position. Particularly, with approach shots into the green, the high spin rate of soft, wound balls enables the golfer to stop the ball very near its landing position.

Relatively recently, a number of golf ball manufacturers have introduced multilayer golf balls, i.e., balls with multiple core layers, a single or multiple intermediate or mantle layers and/or multiple cover layers, in an effort to overcome some of the undesirable aspects of conventional two-piece balls such as their hard feel, while maintaining the positive attributes of these balls such as their increased initial velocity and distance. Further, it is desirable that such multilayer balls have a "click" and feel as well as spin characteristics approaching that of wound balls. Examples of multilayer balls include the Episode (Titleist), Altus Newing (Bridgestone), Giga (Spalding), Metal Mix (Dunlop) and Ultra Tour Balata (Wilson).

Golf ball design and technology have now advanced to the point that the United States Golf Association (USGA), the organization that sets the rules of golf in the United States, has instituted a rule that prohibits the competitive use in any USGA sanctioned event of a golf ball that can achieve an initial velocity of greater than 76.2 meters per second (m/s), or 250 ft/s, when struck by a driver with a velocity of 39.6 m/s, i.e., 130 ft/s (referred to hereinafter as "the USGA test"). However, an allowed tolerance of two percent permits manufacturers to produce golf balls that achieve an initial velocity of 77.7 m/s (255 ft/s).

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the USGA test that approximate the USGA maximum of 77.7 m/s or 255 ft/s as closely as possible.

To meet the needs of golfers having varying levels of skill, golf ball manufacturers are also concerned with varying the compression of the ball, which is a measurement of the deformation of a golf ball or core in inches under a fixed load. Often it is desirable to decease the compression of the golf ball. However, often such reduction in compression also results in a decreased initial velocity, thereby adversely effecting the overall performance of the ball.

A number of elastomers such as polybutadiene, natural rubber, styrene butadiene, and isoprene, are commonly used in fabricating golf ball cores. Golf ball cores are predominantly made of polybutadiene. In order to obtain the desired physical properties for golf balls, manufacturers have added cross-linking agents, such as metallic salts of an unsaturated carboxylic acid to the polybutadiene. The amount of cross-linking agent added is typically about 20 to 50 parts per hundred parts of polybutadiene. Most commonly, zinc diacrylate or zinc dimethacrylate are used for this purpose. Of these two cross-linkers, zinc diacrylate has been found to produce golf balls with greater initial velocity than zinc dimethacrylate.

Typically, about 5 to 50 pph (parts per hundred) of zinc oxide (ZnO) is also added to the composition. This material serves as both a filler and an activation agent for the zinc diacrylate/peroxide cure system. The zinc diacrylate/peroxide cure system, which is well known to those of ordinary skill in this art, cross-links the polybutadiene during the core molding process. The high specific gravity of zinc oxide (5.57) can serve the dual purposes of adjusting the weight of the golf ball, in addition to acting as an activation agent.

Therefore, it would be advantageous to provide a blend for forming a golf ball core which would, provide a ball with a lower compression without adversely affecting the initial velocity and overall distance of the ball. The present invention provides such a golf ball core.

SUMMARY OF THE INVENTION

The present invention is directed towards a method for forming golf ball cores from a blend containing at least one oxa acid compound and golf ball cores and golf balls formed therefrom.

More particularly, the present invention is also directed to a golf ball having a core formed from a core blend comprising an elastomer and at least one oxa acid compound in an amount sufficient to produce a golf ball core with the advantageous properties discussed below. Preferably the core blend comprises a polybutadiene, a metal salt acrylate, preferably zinc diacrylate and a free radical initiator.

It has been found that when an oxa acid is used in a blend for forming a golf ball core, a lower compression golf ball core is obtained, which, when incorporated into a finished golf ball, provides a ball with an initial velocity in the USGA test that is comparable in velocity and distance to a standard, high compression ball. The oxa acid can be added in an amount that reduces the compression of the golf ball, while maintaining the initial velocity of the ball in the USGA test. The oxa acid is incorporated into the core composition of the invention in an amount of up to about 50 parts per 100 (pph) of elastomer.

Having briefly summarized the invention, the invention will be described in detail by reference to the following specification and non-limiting examples.

DETAILED DESCRIPTION OF THE INVENTION

The following terms are defined as related below.

As used herein, the term "oxa acid" means a compound having the formula:

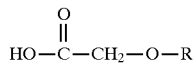

wherein R is an organic moiety selected from the group consisting of alkyl, carbocyclic, and heterocyclic groups.

As used herein, "alkyl groups" means any substituted or unsubstituted acyclic carbon-containing compounds, including but not limited to alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butadiene, and the like. The ordinary skilled artisan is familiar with numerous linear and branched alkyl groups, which are within the scope of the present invention. In addition, such alkyl group may also contain various substituents in which one or more hydrogen atoms has been replaced by a functional group. Functional groups include but are not limited to hydroxyl, amino, carboxyl, amide, ester, ether, and halogen (fluorine, chlorine, bromine and iodine).

As used herein, "carbocyclic groups" means cyclic carbon-containing compounds, including but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, as well as the lower alkyl groups described above.

As used herein, "heterocyclic groups" means closed cyclic carbon-containing compounds wherein one or more of the atoms in the ring is an element other than carbon, e.g., sulfur, nitrogen, etc, including but not limited to pyridine, pyrole, furan, thiophene, and purine.

As used herein, the term "polymer" means any type of polymer including random polymers, block polymers, etc.

This invention is particularly directed towards blends for forming a golf ball core comprising oxa acid compounds of the formula:

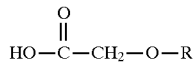

Formula I wherein R is an organic moiety selected from the group consisting of alkyl, carbocyclic, and heterocyclic groups.

Furthermore, the invention is directed towards oxa acid compounds of Formula I, wherein R has the formula:

Formula II wherein R' is an organic moiety selected from the group consisting of alkyl, carbocyclic, and heterocyclic groups and n is an integer from 1 to 27.

Any number of oxa acid compounds of Formula I are contemplated as being useful in the present invention. Some specific oxa acids useful in the novel golf ball compositions of the present invention include 3,6-dioxaheptanoic acid having the formula:

3,6-Dioxaheptanoic acid

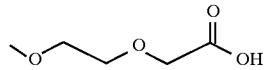

3,6,9 trioxadecanoic acid, having the formula:

3,6,9-Trioxadecanoic acid

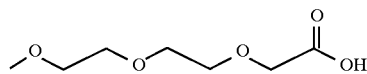

3,6,9-trioxaundecanedioic acid, having the formula:

3,6,9-Trioxaundecanedioic acid

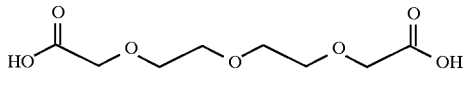

and Polyglycol diacid, having the formula:

Polyglycol diacid (n = 10–12)

These oxa acid compositions possess a variety of properties which make them useful in blends for forming the golf ball core compositions. These properties include wide liquid ranges due to their low melting and high boiling points, high viscosity, good heat stability, solubility in media of widely differing polarity, development of surface-active properties, and good complexing properties for metal ions.

By the present invention, it has been found that oxa acids are useful in blends for core compositions to positively influence the properties of a finished golf ball. In particular, the addition of oxa acids to conventional core compositions has been found to significantly decrease the compression of the finished golf ball without adversely affecting the initial velocity of the ball.

Numerous oxa acid compounds useful in the cover compositions of the present invention are available from Hoechst Celanese Corporation, Fine Chemicals Division under the trade name "Oxa Acids." See Hoechst Celanese Corporation's "Oxa Acids" Brochure (1994).

Additionally, the oxa acid compounds useful in the invention can be synthesized by a variety of synthetic routes known to the skilled organic chemist. It is well known in the art of organic synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic organic chemist knows well how to balance the competing characteristics of synthetic strategies. Thus the compounds of the present invention are not limited by the choice of synthetic strategy, and any synthetic strategy that yields the compounds described above can be used.

A representative base composition for forming a golf ball core prepared in accordance with the present invention comprises polybutadiene as the elastomer and, in parts by weight based on 100 parts polybutadiene, 20–50 pph of a metal salt acrylate such as diacrylate, dimethacrylate, or monomethacrylate, preferably zinc diacrylate. The polybutadiene preferably has a cis 1,4 content of above about 90% and more preferably above about 96%. Commercial sources of polybutadiene include Shell 1220 manufactured by Shell Chemical, Neocis BR40 manufactured by Enichem Elastomers, and Ubepol BR150 manufactured by Ube Industries, Ltd. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are based on 100 parts by weight of the total elastomer mixture.

Metal salt diacrylates, dimethacrylates, and monomethacrylates suitable for use in this invention include those wherein the metal is magnesium, calcium, zinc, aluminum, sodium, lithium or nickel. Zinc diacrylate is preferred, because it has been found to provide golf balls with a high initial velocity in the USGA test. The zinc diacrylate can be of various grades of purity. For the purposes of this invention, the lower the quantity of zinc stearate present in the zinc diacrylate, the higher the zinc diacrylate purity. Zinc diacrylate containing less than about 10% zinc stearate is preferable. More preferable is zinc diacrylate containing about 4–8% zinc stearate. Suitable, commercially available zinc diacrylates include those from Rockland React-Rite and Sartomer. The preferred concentrations of zinc diacrylate that can be used are 20–50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, a—a bis (t-butylperoxy)diisopropylbenzene, 2,5-dimethyl-2,5 di (t-butylperoxy) hexane, or di-t-butyl peroxide, and mixtures thereof. Other useful initiators would be readily apparent to one of ordinary skill in the art without any need for experimentation. The initiator(s) at 100% activity are preferably added in an amount ranging between about 0.05 and 2.5 pph based upon 100 parts of butadiene, or butadiene mixed with one or more other elastomers. More preferably, the amount of initiator added ranges between about 0.15 and 2 pph and most preferably between about 0.25 and 1.5 pph.

A typical golf ball core incorporates 5 to 50 pph of zinc oxide in a zinc diacrylate-peroxide cure system that cross-links polybutadiene during the core molding process.

In the present invention, oxa acids may be added to blends for such core compositions in any amount which imparts the advantageous properties to the core and/or finished ball discussed herein. A single oxa acid compound or a blend of two more different oxa acid compounds may be employed in the present invention. The oxa acids may be present in an amount of about up to about 50 pph of elastomer. Preferably, the oxa acids are present in an amount of about 0.25 to about 25 pph. More preferably, the oxa acids are present in an amount of about 0.40 to about 20.0 pph.

The cores and balls produced from such an admixture typically exhibit enhanced performance properties. In particular, the initial velocity of a golf ball is maintained at or near the maximum allowed by the USGA, but the compression of the ball is reduced markedly when the golf ball's core is formed from an elastomer blend containing an oxa acid composition.

The compositions of the present invention may also include fillers, added to the elastomeric composition to adjust the density and/or specific gravity of the core. As used herein, the term "fillers" includes any compound or composition that can be used to vary the density and other properties of the subject golf ball core. Fillers useful in the golf ball core according to the present invention include, for example, zinc oxide, barium sulfate, and regrind (which is recycled core molding matrix ground to 30 mesh particle size). The amount and type of filler utilized is governed by the amount and weight of other ingredients in the composition, since a maximum golf ball weight of 1.620 ounces (45.92 gm) has been established by the USGA. Appropriate fillers generally used range in specific gravity from about 2.0 to 5.6.

Antioxidants may also be included in the elastomer cores produced according to the present invention. Antioxidants are compounds which prevent the breakdown of the elastomer. Antioxidants useful in the present invention include, but are not limited to, quinoline type antioxidants, amine type antioxidants, and phenolic type antioxidants.

Other ingredients such as accelerators, e.g. tetra methylthiuram, processing aids, processing oils, plasticizers, dyes and pigments, as well as other additives well known to the skilled artisan may also be used in the present invention in amounts sufficient to achieve the purpose for which they are typically used.

The core compositions of the invention may be produced by forming a mixture comprising at least polybutadiene, zinc diacrylate, and at least one oxa acid. In preparing the core blends, when a set of predetermined conditions is met, i.e., time and temperature of mixing, the free radical initiator is added in an amount dependent upon the amounts and relative ratios of the starting components, all of which would be well understood by one of ordinary skill in the art. In particular, as the components are mixed, the resultant shear causes the temperature of the mixture to rise. Peroxide(s) free radical initiator(s) are blended into the mixture for crosslinking purposes in the molding process.

After completion of the mixing, the golf ball core composition is milled and hand prepped or extruded into pieces ("preps") suitable for molding. The milled preps are then compression molded into cores at an elevated temperature. Typically, 160° C. (320° F.) for 15 minutes is suitable for this purpose. These cores can then be used to make finished golf balls by surrounding the cores with mantle and/or cover materials.

The present invention is directed towards not only cores for use in conventional two-piece and wound golf balls, but also to cores for multilayer golf balls as well. In fact, the present invention contemplates that the presently claimed cores can be employed in golf balls of any construction, wherein the construction includes a solid core.

EXAMPLES

The following examples are given to illustrate the novel golf ball core compositions of the present invention. It is to be understood, however, that the invention is not limited to these specific examples.

Example 1

Two-piece golf balls made with core blends containing oxa acids were produced as follows. Utilizing conventional production methods, four groups of cores of the blend batch formulations set forth in Table 1 below having a diameter of about 1.510 inches were compression molded. The batch formulations below set forth the amount of each core blend constituent in parts per total blend formulation.

TABLE 1

BATCH FORMULATIONS FOR CORES CONTAINING OXA ACIDS

| Ingredients | Control | Group 1 | Group 2 | Group 3 |
|---|---|---|---|---|
| 1,4-polybutadiene | 163.87 | 163.87 | 163.87 | 163.87 |
| zinc diacrylate | 59.84 | 59.84 | 59.84 | 59.84 |
| zinc oxide | 8.29 | 8.29 | 8.29 | 8.29 |
| regrind | 34.98 | 34.98 | 34.98 | 34.98 |
| SR350 (trimethylolpropane trimethacrylate) | 2.57 | 2.57 | 2.57 | 2.57 |
| Varox (peroxide initiator) | 0.728 | 0.728 | 0.728 | 0.728 |
| Vulcup (peroxide initiator) | 0.396 | 0.396 | 0.396 | 0.396 |
| Filler | 18.41 | 18.41 | 18.41 | 18.41 |
| 3,6-Dioxaheptanoic Acid | | 0.46 | 7.25 | 16.40 |

Using the cores of the formulations of Table 1, golf balls of a two-piece construction were produced using conventional manufacturing processes. Specifically, hemispherical cups of cover compositions comprising a 50/50 blend of SURLYN® 7930 and SURLYN® 8920 were formed by injection molding. The cups were then compression molded around the cores using standard molding techniques. The amount of oxa acid added to each group of balls corresponds to 0, 0.3, 4.4 and 10.0 parts oxa acid per 100 parts (pph) elastomer.

The balls were finished and then tested for compression and initial velocity is obtained using a conventional technique employing a gauge manufactured by Atti Engineering Co. in order to determine the relative compression of the ball.

The initial velocity results were obtained from the dual pendulum technique disclosed in U.S. Pat. No. 2,058,201 to Young whereby the balls are struck at 39.6 m/s (130 ft/s) and pass through light gates from which the speed of the balls is calculated. The results of this testing are reported in Table 2 below.

TABLE 2

| | Finished Balls | | | |
|---|---|---|---|---|
| | Control | Batch 1 | Batch 2 | Batch 3 |
| Compression | 124.30 | 123.60 | 89.00 | 36.20 |
| Std. Dev. | 0.90 | 1.20 | 4.30 | 9.00 |
| Velocity | 255.21 | 255.45 | 252.17 | 247.60 |
| Std. Dev. | 0.27 | 0.31 | 0.34 | 1.23 |

As illustrated above, golf balls made from cores formed from blends comprising oxa acids exhibit a marked decrease in compression. Of particular interest is a comparison of the results for the control golf balls and golf balls formed from cores of Batch #2, which demonstrates a striking decrease in compression while maintaining an acceptable initial velocity.

While it is apparent that the illustrative embodiments of the invention herein disclosed fulfills the objectives stated above, it will be apparent that numerous modifications and other embodiments may be devised by those skilled in the art. Therefore, it will be understood that the appended claims are intended to cover all such modifications which come within the spirit and scope of the present invention.

We claim:

1. A golf ball comprising a cover and a core wherein said core is formed from an elastomeric core blend which comprises at least one oxa acid compound having the formula:

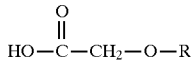

wherein R is an organic moiety selected from the group consisting of moieties having the formula —[$CH_2$—$CH_2$—O]$_n$—R' and alkyl, carbocyclic, and heterocyclic groups, R' is an organic moiety selected from the group consisting of alkyl, carbocyclic, carboxylic acid, and heterocyclic groups, and n is at least 1.

2. The golf ball according to claim 1, wherein R has the formula:

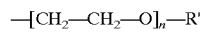

wherein R' is an organic moiety selected from the group consisting of alkyl, carbocyclic, carboxylic acid, and heterocyclic groups and n is an integer greater than 1.

3. The golf ball according to claim 2, wherein R' has the formula:

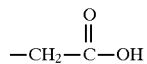

4. The golf ball according to claim 3, wherein n is an integer between 1 and 27.

5. The golf ball according to claim 2, wherein R' is a methyl group.

6. The golf ball of claim 1 wherein the golf ball is a wound ball which further comprises a layer of elastic thread disposed between the cover and the core.

7. The golf ball of claim 1, wherein the core blend further comprises a polybutadiene and a metal salt acrylate.

8. The golf ball of claim 1, wherein the oxa acid compound is present in the core blend in an amount of from about 0.25 to about 50.0 pph of elastomer.

9. The golf ball of claim 1, wherein the oxa acid compound is present in the blend in an amount of about 0.25 to about 20.0 pph of elastomer.

10. The golf ball of claim 1 which further comprises at least one intermediate layer disposed between the cover and the core.

11. A method for making a golf ball comprising:

(a) selecting an oxa acid compound having the formula

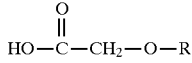

wherein R is an organic moiety selected from the group consisting of moieties having the formula —[$CH_2$—$CH_2$—O]$_n$—R' and alkyl, carbocyclic, and heterocyclic groups, R' is an organic moiety selected from the group consisting of alkyl, carbocyclic, carboxylic acid, and heterocyclic groups, and n is at least 1;

(b) forming an elastomeric core blend comprising said oxa acid compound;

(c) forming a golf ball core from said blend; and (d) molding a cover around said golf ball core to form a golf ball.

12. The method of claim 11, wherein R has the formula:

wherein R' is an organic moiety selected from the group consisting of alkyl, carbocyclic, carboxylic acid, and heterocyclic groups and n is an integer greater than 1.

13. The method of claim 12, wherein the core blend further comprises a polybutadiene and a metal salt acrylate.

14. The method of claim 11, wherein the oxa acid compound is present in the core blend in an amount of from about 0.25 to about 50 pph of elastomer.

15. The method of claim 11, wherein the oxa acid compound is present in the core blend in an amount of 0.25 to about 30 pph of elastomer.

16. The method of claim 11, wherein the core is formed by compression molding the core blend.

17. The method of claim 11, further comprising:

(a) molding at least one intermediate layer around the core; and (b) molding a cover around said intermediate layer.

18. The method of claim 11, further comprising:

(a) winding an elastic thread around the core to form a wound layer; and (b) molding a cover around said wound layer.

* * * * *